UNITED STATES PATENT OFFICE.

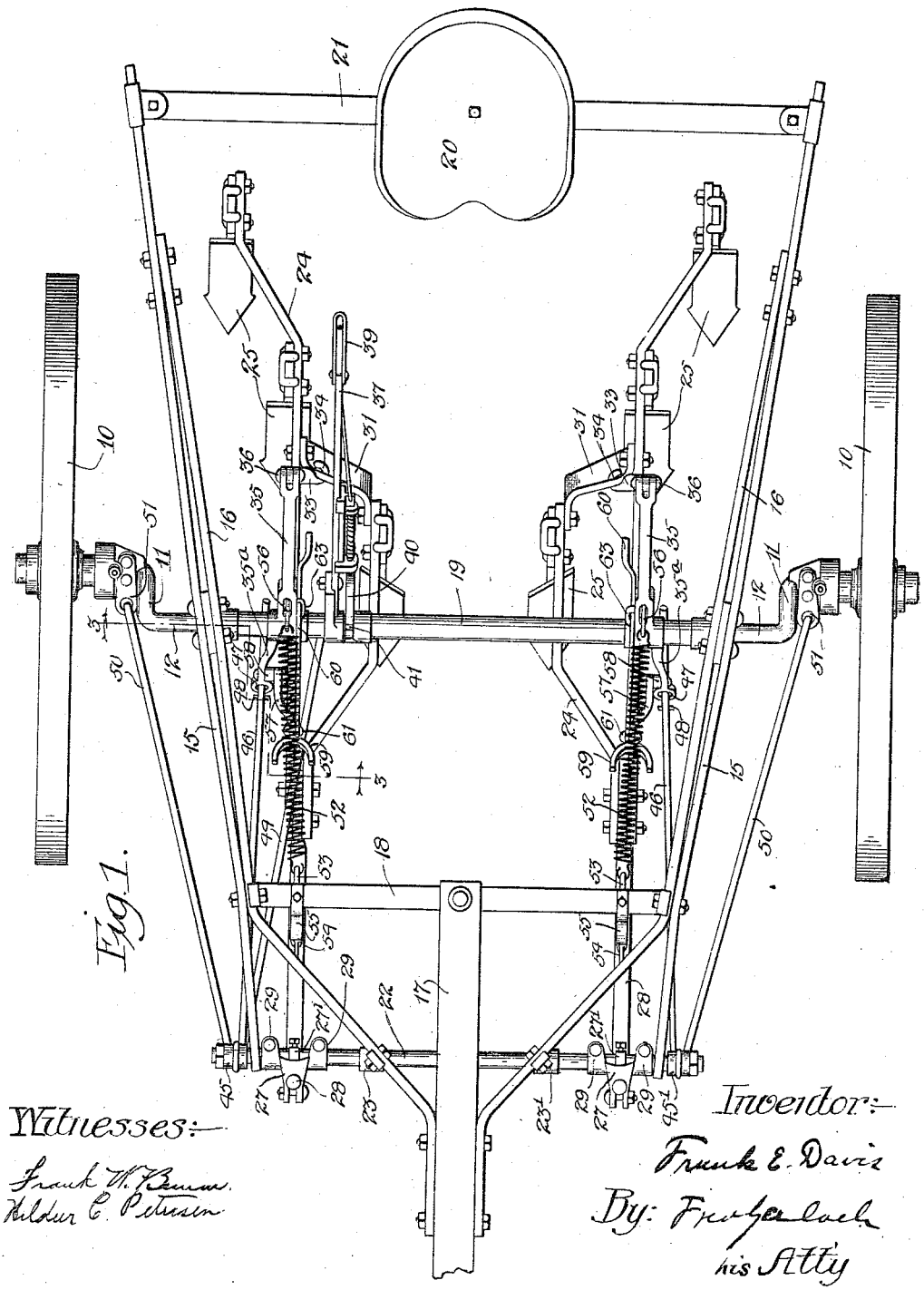

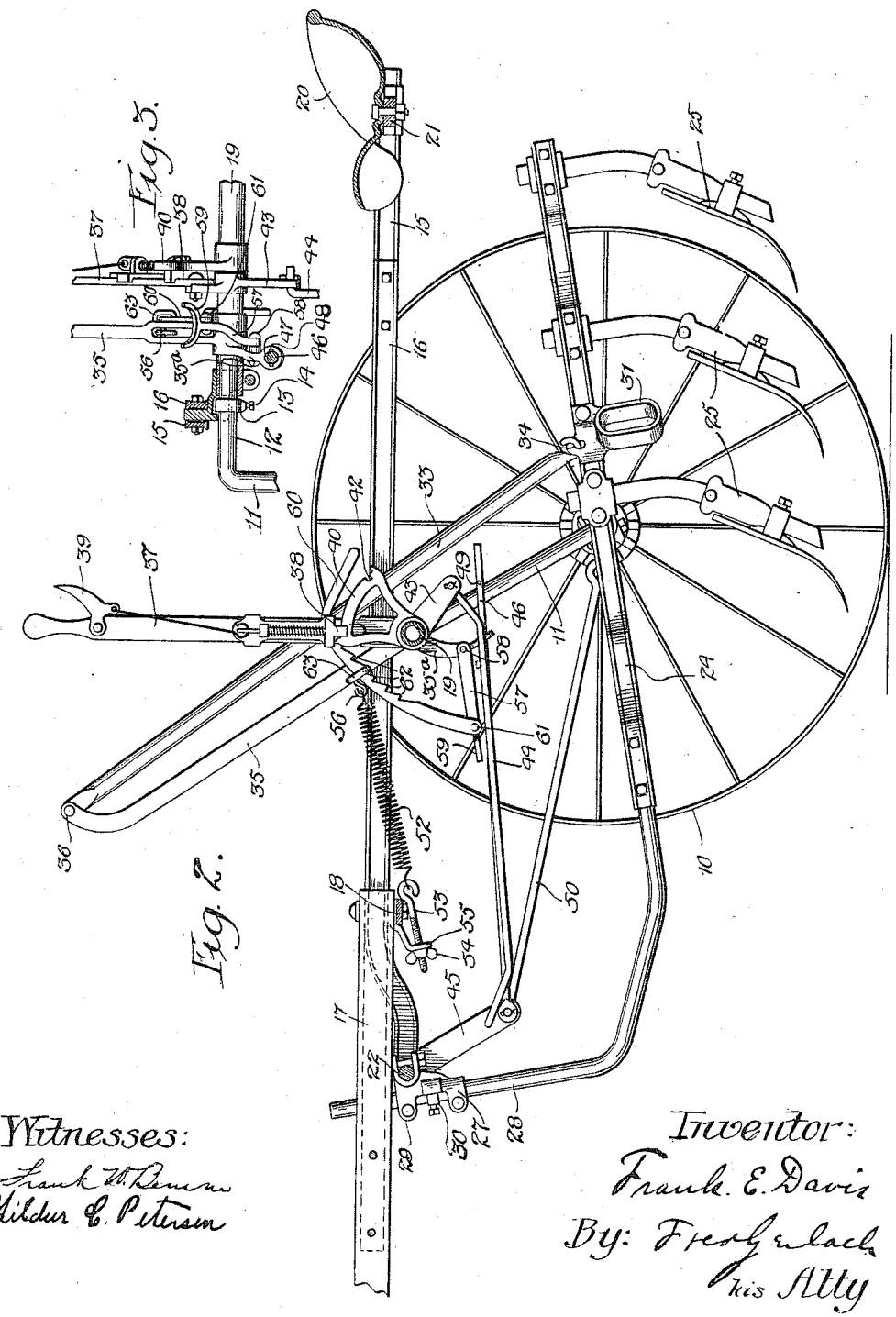

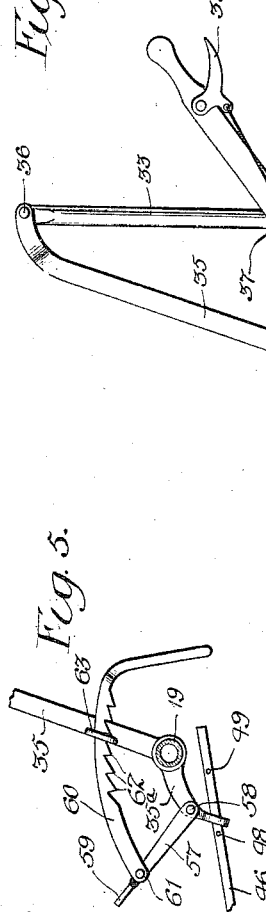

FRANK E. DAVIS, OF LA CROSSE, WISCONSIN, ASSIGNOR OF ONE-HALF TO ALBERT HIRSHHEIMER, OF LA CROSSE, WISCONSIN.

CULTIVATOR.

964,763.

Specification of Letters Patent. Patented July 19, 1910.

Application filed February 2, 1910. Serial No. 541,561.

*To all whom it may concern:*

Be it known that I, FRANK E. DAVIS, a resident of La Crosse, in the county of La Crosse and State of Wisconsin, have invented certain new and useful Improvements in Cultivators, of which the following is a full, clear, and exact description.

The invention relates to wheeled cultivators, and more particularly to the class commonly known as "pendulum beam cultivators."

In cultivators of this type, it is now common practice to provide yielding-means, such as a spring, which is applied to the beam-lifting mechanism, so as to permit the shovel-gangs to be depressed by the operator when the cultivator is being operated in the soil, and to restore the shovels carried by the beams to the normal working position after they have been depressed. In practice, it has been found that occasion frequently arises when the tension of the yielding-means or spring should be varied according to the soil being worked, to better control the restoration of the shovels to their normal or desired working position. For example, in soils of certain character. That greater tension is necessary to return of the shovels to normal working position when the operator releases the pressure upon the shovel-beams, and at other times, less tension is desirable and it is desirable that adjustment of this tension should be made by the operator of the machine when it is in operation in the field or working on the soil, so that the tension may at all times be regulated to a nicety to adapt the cultivator to the varying conditions of the soil. Preferably this adjustment should be possible without stopping the progress of the machine.

One object of the invention is to provide means of this character, whereby the tension of the spring-connection for the cultivator-beam may be adjusted by the operator of the machine when the shovels are at work in the ground.

Another object of the invention is to provide improved shifting-means for the cultivator-beams and the carrying-wheels to keep the cultivator balanced when the shovels are raised or lowered.

Another object of the invention is to provide improved means for shifting the cultivator-beams, and which leaves the latter free to be depressed by the operator and restored to normal working position by a spring-connection which is independently connected to the pendulum-arm, and further to provide an improved construction of lifting-mechanism, in which the hand-lever is disposed within convenient reach of the operator.

The invention consists in the several novel features hereinafter set forth and more particularly defined by claims at the conclusion hereof.

Figure 1 is a plan of a cultivator embodying the invention. Fig. 2 is a central vertical longitudinal section, the parts being shown in position assumed when the cultivator-beams are raised. Fig. 3 is a section on line 3—3 of Fig. 1. Fig. 4 is a view similar to Fig. 2, but showing one of the beams in lowered position and the other parts in corresponding positions. Fig. 5 is a detail of one of the adjusting-devices for one of the spring-connections.

The frame of the cultivator is supported by the usual carrying-wheels 10, which are journaled on laterally projecting spindles at the outer ends of arch-axles 11, each of which is provided at its upper end with an inwardly extending arm or portion 12 which is journaled in the frame, so that the wheel-spindles at the lower ends of the arch-axles may be shifted longitudinally to balance the cultivator. Each inwardly extending arm 12 of the arch-axle, is adjustable laterally in the frame, being held by a collar 13, which is held against transverse movement in the frame, and through which the arm may be slidably adjusted when the set-screw 14 which holds collar 13 on its arm 12, is loosened. Resultantly, the carrying-wheels may be adjusted transversely, for purposes well understood in the art. A supporting-frame is sustained by the arch-axles and is constituted of outer side-bars 15, inner-side-bars 16 which are extended inwardly at the front of the frame and secured to the usual tongue 17, a cross-bar 18 secured to side-bars 15 and 16, and a tubular cross-member or pipe 19, which is rigidly secured to the side-bars to form a substantially rigid frame. An operator's seat 20 is supported by a strap 21 which is suspended from the rear ends of the side-bars 15.

A cross-shaft 22 is mounted in brackets 23 and 23' which are secured to the bars 15 and 16 of the frame. A cultivator-beam 24 carrying shovels 25, is provided at each side of the machine. Each shovel-carrying beam is sustained at its front to the frame by a universal joint, or coupling which permits the rear end of the beam to be raised or lowered and swung laterally. The coupling for connecting each beam to the frame, consists of a forked bracket 27 which is journaled on the cross-shaft 22 and held against longitudinal movement on said shaft by a collar 27' which may be adjusted along the shaft to correspondingly adjust the line of travel of the beam, so the beams may be caused to travel at the desired distance apart. Each beam 24 is provided at its end with a standard 28, which extends through lugs 29 on the collar 27 and an adjustable collar 30 on standard 28 secures the beams against vertical movement in the coupling. By adjusting the collar 30, the shovel-beams may be adjusted vertically in the coupling to cause the shovels to travel in the ground at the desired pitch. Standard 28 and collar 30 are journaled in the bracket 27 to permit the rear end of the shovel-beams to be swung laterally by the operator. Resultantly, these couplings at the front end of the shovel-beams permit the front end of the cultivator-beams to be adjusted laterally to or from one another, permit the shovels to be swung laterally, and permit the shovel-beams to be raised and lowered, the coupling swinging on cross-shaft 22 and the vertical position of the shovel-beams may be varied by adjustment of the standards 28 in the coupling. Each shovel-beam is provided with a stirrup 31, whereby the operator may guide the cultivator-beams laterally, and may depress them.

Each cultivator beam is controllably suspended from the frame by a pendulum 33 which is pivotally connected at its lower end to the beam, as at 34, and an arm 35 which is pivotally mounted on the cross-member 19 of the frame and has its upper end pivotally connected as at 36, to the upper end of a pendulum 33. These arms serve to raise and lower the rear ends of the beams and shovels carried thereby.

The mechanism for operating arms 35 to shift the beams consists of a lever 37 which is pivoted on the tubular frame-member 19 and is provided with a lock 38 controlled by a finger-lever 39 on said lever, the lock being adapted to engage a rack 40, which is fixedly secured on pipe 19. The rack is provided with a notch 41 disposed to lock the lever 37 in position to hold the beams in raised position and a notch 42 disposed to lock the lever 37 in position when the beams are lowered. Lever 37 is provided with a downwardly extending arm 43 which is connected by a rod or link 44 to an arm 45 which is secured to the cross-shaft 22 so that when lever 37 is shifted, arm 45 and shaft 22 will be rocked to operate the connections for raising and lowering the beams. The lifting connection for the beam at the right hand side comprises a rod or bar 46 which has its front end pivotally connected to the lower end of arm 45 and its rear end connected to arm 35, by means of an extension or arm 35$^a$ extending forwardly and downwardly from arm 35, which has a guide opening 47 through its lower end in which the rear end of rod 46 is slidably held and an abutment 48, such as a pin on said rod, which is adapted to engage the extension 35$^a$ and to shift it backwardly to rock arm 35. This device provides a lost-motion connection between rod 46 and arm 35, which permits the beam to be depressed by the operator independently of the rod 46 or the lever for raising the beams. Rod 46 is provided with an abutment consisting of a pin 49, in the rear of arm 35$^a$, which prevents the rod from being withdrawn from said arm. At the left hand side of the cultivator, an arm 45' is secured to cross-shaft 22, so that it will be operated with arm 45 to which the shifting-lever 37 is connected, and this arm 45' is operatively connected to arm 35 for the left hand beam in the same manner as arm 45 is connected to the other arm 35. Resultantly, shifting-lever 37 serves by means of rod 44, arm 45 and shaft 22 to operate the lifting-connections for both beams. Lever 37 also serves to shift the arch-axles to swing them forwardly as the beams are lowered, and to swing the arch-axles rearwardly as the beams are raised, to properly balance the cultivator. For this purpose a link 50 is pivotally connected to the lower portion of the arch-axle at the right hand side, as at 51, and to arm 45 on shaft 22, and arm 45' at the other side is likewise connected to the carrying-wheel at the left hand side. When shifting-lever 37 is operated to raise or lower the shovels, said connections will simultaneously adjust the carrying-wheels to keep the frame properly balanced.

In practice, it is frequently necessary for the operator to depress the shovel-beams in order to effect proper cultivation, particularly in uneven ground. To permit either beam to be depressed by the foot of the operator without the necessity of operating the beam-shifting lever, a spring-connection is applied to each of the arms 35, which may also serve as a counterbalance or aid in lifting the beams and shovels. These spring-connections yieldingly hold the shovels in position to travel at the desired normal depth, and also permit them to be depressed by the operator and restore them to normal working depth when the foot pressure of the operator is released. Each spring-connection comprises a spring 52 having its front end adjustably connected by means of a screw-hook 53 and nut 54 to a bracket 55 on the frame, and its rear end pivotally connected by a pin 56 to an arm 35. At times it is desired to vary the tension of these connections and to effect this variation of the tension of the springs while the shovels are working in the ground. A spring-shifter 57 is pivoted as at 58, to extension 35ª and its opposite end is forked, as at 59 to engage spring 52 to deflect the spring to increase its tension more or less according to the position in which the shifter is set. The shifter is controlled by a hand-lever 60, which is pivotally connected as at 61 to the shifter and is provided with rock-teeth 62 adapted to engage an eye or loop 63 on arm 35. By releasing the lever 60 from eye 63, it may be adjusted to operate shifter 57 in the position to distend spring 52 in greater or less degree, to correspondingly vary the tension of the spring upon the arm 35, the beam and shovels connected thereto. For example, if it is found in operating the cultivator that greater tension is desired, lever 60 may be adjusted backwardly through the guide 63, which will swing the shifter 57 backwardly and cause the fork 59 to distend the spring in greater degree. This adjustment may be readily effected when the machine is in operation, so that the operator can, whenever necessary, adjust the tension of the spring-connection to cause the beams to work as desired, according to the conditions of the soil being cultivated or the depth of cultivation desired. The construction of this adjusting-device is such that the spring-connection will not exert excessive tension, when the shovels are out of the ground and greatest tension will be exerted when the shovels are in the soil.

When the beams are raised, as illustrated in Fig. 2, they will be held by abutments 48 on rods 46 which engage extensions 35ª on arms 35, lever 37 being locked to rack 40, so its connections to rods 46 will also be locked. The arch-axles will be in rearward position relatively to the frame to balance the structure, and will be held by means of links 50, arms 45, 45′ and rock-shaft 22 which will be held by rod 44 and lever 37. To lower the beams, lever 37 will be unlocked from rack 40 and shifted rearwardly to the position illustrated in Fig. 4. Such shift of the lever will operate rod 44 forwardly to correspondingly shift arm 45 and rod 46 connected thereto and by means of rock-shaft 22 will operate arm 45′ and the rod 46 at the left hand side which lifts the connection for the left hand beam. Such shift will cause abutments 48 to move forwardly and to release arms 35 so the beams will be free to permit the shovels to pass into working position in the soil as shown on Fig. 4. When lever 37 is locked in the rear position and the shovels are at normal working depth in the soil, abutments 48 will be disposed out of engagement with or forwardly of, extensions 35ª, so that arms 35 will be free to permit further depression of the shovels by the operator independently of, or without unlocking, lever 37. When lever 37 is shifted to release the beams, the connections which control the spindles of the arch-axles will be operated to swing the arch-axles forwardly, so that the frame will be properly balanced when the shovels are at work in the soil. When arms 35 are swung backwardly as the beams are lowered, and the shovels pass into the ground, spring-shifters 57 and hand-levers 60, which are locked to said arms, will move with the arms and cause the forked ends of the shifters to engage springs 52 to deflect the spring-connections. By adjustment of hand-levers 60, which may be readily done while the machine is being operated, the extent of deflection may be varied at the will of the operator, so that when the beams are depressed by the treadles 31, which is frequently necessary in cultivation, the spring-connections will restore the shovels to normal or desired working depth. By adjusting hand-lever 60 forwardly, the shifter may be adjusted so it will not deflect its spring-connection at all, and by rearward adjustment, the shifter may be set to to deflect the connection to increase its tension on the beams as much as desired. As a result, the beams are left free to respond to the will of the operator when the shovels are in the ground and the tension of the spring-connections may be readily varied independently of each other and without stopping the operation of the cultivator. To raise the shovels out of the ground, lever 37 will be shifted forwardly, to operate rod 44, arms 45, 45′ and rods 46 backwardly, so that abutments 48 will engage extensions 35ª and swing arms 35 to lift the beams, and will operate the connection for the wheel-spindles.

The invention thus provides a pendulum-beam cultivator with means for regulating the tension of the spring-connections for the shovels, while the latter are at work in the soil. The lifting mechanism, is operated by a lever which is disposed within convenient reach of the operator and has a lost-motion connection with the lifting-connections to permit the beams to be depressed independently of the lever, and this lever also operates the wheel-spindles to balance the structure when the beams are in raised or lowered positions. The connections between the lifting-lever and the pendulum-arms are simple in construction.

The invention is not to be understood as restricted to the details shown and described, since these may be modified within the scope of the appended claims without departing from the spirit and scope of the invention.

Having thus described the invention, what I claim as new and desire to secure by Letters Patent, is:

1. In a cultivator, the combination of a frame, carrying-wheels, a cultivator beam, beam shifting mechanism comprising a pendulum and an arm having an extension thereon, a spring-connection for the beam, and adjusting means for said connection comprising a shifter pivoted to said extension, and a lever connected to said shifter.

2. In a cultivator, the combination of a frame, carrying-wheels, a cultivator beam, beam shifting mechanism comprising a pendulum and an arm having an extension thereon, a spring-connection for the beam, and adjusting means for said connection comprising a shifter pivoted to said extension, a hand lever connected to said shifter and a lock for said lever.

3. In a cultivator, the combination of a frame, carrying-wheels, a cultivator-beam, beam-shifting mechanism comprising an arm, a pendulum, a beam-operating lever and a lost-motion connection between the lever and the arm, a spring-connection for the beam which permits the beam to be shifted independently of said lever, and means for adjusting the spring-connection comprising a hand-lever.

4. In a cultivator, the combination of a frame, carrying-wheels, a cultivator-beam, beam-shifting mechanism comprising an arm, a pendulum, a beam-operating lever and a lost-motion connection between the lever and the arm, a lock for said lever, a spring-connection for the beam which permits the beam to be shifted independently of said lever, and means for adjusting the spring-connection comprising a hand-lever.

5. In a cultivator, the combination of a frame, carrying-wheels, a cultivator-beam, beam-shifting mechanism comprising an arm, a pendulum, a lever and a lost-motion connection between the lever and the arm, a lock for said lever, a spring-connection for the beam which permits the beam to be shifted independently of said lever, and means for adjusting the spring-connection comprising a hand-lever, and a rack for holding said hand-lever.

6. In a cultivator, the combination of a frame, carrying-wheels, a cultivator-beam, beam-shifting mechanism comprising an arm, a pendulum and a beam-operating lever, a spring-connection for the beam, means for adjusting said connection comprising a shifter for deflecting the connection, and means for adjusting said shifter to vary the deflection of the connection.

7. In a cultivator, the combination of a frame, carrying-wheels, a cultivator-beam, beam-shifting mechanism comprising an arm, a pendulum and a lever, a spring-connection for the beam, and means for adjusting said connection comprising a shifter for deflecting the connection, a hand-lever for adjusting said shifter and a rack for holding said hand-lever.

8. In a cultivator, the combination of a frame, carrying-wheels, a cultivator-beam, beam-shifting mechanism comprising an arm, a pendulum and a lever, a spring-connection for the beam and a shifter adjustably mounted on said arm, and for deflecting the spring-connection to vary the tension of the connection.

9. In a cultivator, the combination of a frame, carrying-wheels, a cultivator-beam, beam-shifting mechanism comprising an arm, a pendulum and a lever, a spring-connection for the beam, a shifter pivotally mounted on said arm, and for deflecting the spring-connection to vary the tension of the connection, and a hand-lever for adjusting said shifter.

10. In a cultivator, the combination of a frame, carrying-wheels, a cultivator-beam, beam-shifting mechanism comprising an arm, a pendulum and a lever, a spring-connection for the beam, a shifter pivotally mounted on said arm, and for deflecting the spring-connection to vary the tension of the connection, a hand-lever for adjusting said shifter and a rack for the hand-lever.

11. In a cultivator, the combination of a frame, carrying-wheels, a cultivator-beam, beam-shifting mechanism comprising an arm, a pendulum, and a lever and a lost-motion connection between the lever and the arm, a spring-connection for the beam which permits the beam to be shifted independently of said lever, and means for adjusting the spring-connection comprising a hand-lever, and a shifter pivoted to an extension on said arm.

12. In a cultivator, the combination of a frame, carrying-wheels, a cultivator-beam, an arm, a pendulum between the arm and the beam, a lever, and a connection between the arm and the lever comprising a rod operated by the lever and for shifting the arm, the rod having a slidable connection which permits the arm to be shifted independently of the lever.

13. In a cultivator, the combination of a frame, carrying-wheels, a cultivator-beam, an arm, a pendulum between the arm and the beam, a lever, a lock for said lever, and a connection between the arm and the lever comprising a rod operated by the lever and for shifting the arm, the rod having a slidable connection which permits the arm to be shifted independently of the lever.

14. In a cultivator, the combination of a frame, carrying-wheels, a cultivator-beam, an arm, a pendulum between the arm and the beam, a lever, a lock for said lever, a spring-connection between the arm and the frame, and a connection between the arm and the lever comprising a rod operated by the lever and for shifting the arm, the rod having a slidable connection which permits the arm to be shifted independently of the lever.

15. In a cultivator, the combination of a frame, carrying-wheels, a cultivator-beam, an arm, a pendulum between the arm and the beam, a lever, a front arm operated by said lever, and a rod between said arms, and having a pivotal connection to one of said arms and slidably connected to the other, to permit the pendulum-arm to be shifted independently of the lever.

16. In a cultivator, the combination of a frame, carrying-wheels, a cultivator-beam, an arm, a pendulum between the arm and the beam, a lever, a spring-connection for said arm, a front arm operated by said lever, and a rod between said arms, and having a pivotal connection to one of said arms and slidably connected to the other, to permit the pendulum-arm to be shifted independently of the lever.

17. In a cultivator, the combination of a frame, carrying-wheels, a cultivator-beam, an arm, a pendulum between the arm and the beam, a lever, a lock for said lever, and a connection between the arm and the lever comprising a rod operated by the lever and for shifting the arm, the rod having a slidable connection which permits the arm to be shifted independently of the lever.

18. In a cultivator, the combination of a frame, carrying-wheels, a cultivator-beam, an arm, a pendulum between the arm and the beam, a lever, and a connection between the arm and the lever, comprising a rod slidably connected to said arm.

19. In a cultivator, the combination of a frame, carrying-wheels, a cultivator-beam, an arm, a pendulum between the arm and the beam, a lever, a spring-connection for said arm, and a connection between the arm and the lever, comprising a rod slidably connected to said arm.

20. In a cultivator, the combination of a frame, carrying-wheels, a cultivator-beam, an arm, a pendulum between the arm and the beam, a lever, and a connection between said arm and the lever comprising a guide on said arm, a rod slidably mounted on said guide and an abutment on the rod for shifting said arm, the rod being connected to the lever.

21. In a cultivator, the combination of a frame, carrying-wheels, a cultivator-beam, an arm, a pendulum between the arm and the beam, a lever, and a connection between said arm and the lever comprising a guide on said arm, a rod slidably mounted on said guide, and abutments on the rod for shifting the arm, the rod being connected to the lever.

22. In a cultivator, the combination of a frame, carrying-wheels, a cultivator-beam, an arm, a pendulum between the arm and the beam, a beam-operating lever, and a connection between the arm and the lever, comprising a rod pivoted to the lever and extending forwardly therefrom, an arm to which said rod is pivoted, and a rearwardly extending rod operated by said latter arm and operatively connected at its rear to the pendulum-arm.

23. In a cultivator, the combination of a frame, carrying-wheels, a cultivator-beam, an arm, a pendulum between the arm and the beam, a lever, and a connection between the arm and the lever, comprising a rod pivoted to the lever and extending forwardly therefrom, an arm to which said rod is pivoted, and a rearwardly extending rod operated by said latter arm, and being slidably connected to one of said arms and pivoted to the other.

24. In a cultivator, the combination of a frame, carrying-wheels, a cultivator-beam, an arm, a pendulum between the arm and the beam, a lever, and a connection between the arm and the lever, comprising a rod pivoted to the lever and extending forwardly therefrom, an arm to which said rod is pivoted, and a rearwardly extending rod operated by said latter arm, and being slidably connected to the pendulum-arm and operatively connected to the other arm.

25. In a cultivator, the combination of a frame, carrying-wheels, wheel-spindles adjustably connected to the frame, a cultivator-beam, an arm, a pendulum between the arm and the beam, a beam-operating lever, an arm in front of said lever, a rod between said lever and the arm in front thereof, spindle-adjusting connections operated by said front-arm, and a pendulum-arm shifting-rod operated by the front arm.

26. In a cultivator, the combination of a frame, carrying-wheels, wheel-spindles adjustably connected to the frame, a cultivator-beam, an arm, a pendulum between the arm and the beam, a beam-operating lever, an arm in front of said lever, a cross-shaft on which said latter arm is mounted, a rod between said lever and the arm in front thereof, spindle-adjusting connections operated by said front-arm, and a pendulum-arm shifting-rod operated by the front-arm.

27. In a cultivator, the combination of a frame, carrying-wheels, wheel-spindles adjustably connected to the frame, a cultivator-beam, an arm, a pendulum between the arm and the beam, a beam-operating lever, an arm in front of said lever, a rod between said lever and the arm in front thereof, spindle-adjusting connections operated by said front-arm, and a pendulum-arm shifting-rod pivoted to one of said arms and slidably connected to the other.

28. In a cultivator, the combination of a frame, carrying-wheels, wheel-spindles adjustably connected to the frame, a cultivator-beam, an arm, a pendulum between the arm and the beam, a beam-operating lever, an arm in front of said lever, a rod between said lever and the arm in front thereof, spindle-adjusting connections operated by said front-arm, and a pendulum-arm shifting-rod pivoted to the front-arm and slidably connected to the pendulum-arm.

29. In a cultivator, the combination of a frame, carrying-wheels, wheel-spindles adjustably connected to the frame, a cultivator-beam, an arm, a pendulum between the arm and the beam, a beam-operating lever, spindle-adjusting connections operated by said lever, a spring-connection for the arm, a hand-lever for adjusting the spring-connection, and a connection between the beam-operating lever and said arm.

30. In a cultivator, the combination of a frame, carrying-wheels, wheel-spindles adjustably connected to the frame, a cultivator-beam, an arm, a pendulum between the arm and the beam, a beam-operating lever, an arm in front of said lever, a rod between the lever and the front-arm, spindle-adjusting connections operated by said front arm, a spring-connection for said arm, a hand-lever for adjusting said spring-connection, and a rod operated by the front-arm, for shifting the pendulum-arm.

FRANK E. DAVIS.

Witnesses:
C. W. DICKINSON,
N. G. JONES.